(12) United States Patent
Van Gestel

(10) Patent No.: US 6,246,443 B1
(45) Date of Patent: Jun. 12, 2001

(54) SIGNAL PROCESSING DEVICE FOR ADJUSTING DIFFERENCES IN SIGNAL PARAMETERS

(75) Inventor: Henricus A. W. Van Gestel, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/028,428

(22) Filed: Feb. 24, 1998

(30) Foreign Application Priority Data

Feb. 26, 1997 (EP) .................................................. 97200544

(51) Int. Cl.⁷ .............................. H04N 5/14; H04N 5/268
(52) U.S. Cl. ........................ 348/571; 348/705; 348/706
(58) Field of Search ..................................... 348/571, 705, 348/706, 725; H04N 5/14, 9/64, 5/268

(56) References Cited

U.S. PATENT DOCUMENTS

| 4,996,597 | * | 2/1991 | Duffield | ............................... 348/705 |
| 5,046,107 | | 9/1991 | Iwamatsu | .............................. 381/107 |
| 5,801,785 | * | 9/1998 | Crump | .................................. 348/705 |

* cited by examiner

Primary Examiner—Sherrie Hsia
(74) Attorney, Agent, or Firm—Laurie E. Gathman

(57) ABSTRACT

A signal processing device which selects a signal, using for example, a channel selector in a television receiver or a source selection circuit in an amplifier, and compensates automatically for differences in signal parameters, such as volume of sound or picture brightness, between the signal sources. Corrections which are applied to the relevant parameter within a given time interval after source selection are divided within the time interval between a global value and a local value (for example an offset) for the relevant signal source.

16 Claims, 1 Drawing Sheet

SIGNAL PROCESSING DEVICE FOR ADJUSTING DIFFERENCES IN SIGNAL PARAMETERS

BACKGROUND OF THE INVENTION

The invention relates to a signal processing device comprising:
- a signal source selection means for selecting a signal source from a set of at least two signal sources, the signal from each of the signal sources having at least one controllable parameter, whose value W is defined by a global value G and a local value L associated with a selected signal source,
- a control for adjusting the value W,
- a storage register for the storage of the global value G,
- for each signal source a storage register for the storage of the local value L,
- means for obtaining the resultant value W by means of a predetermined combination of G and L.

Such a signal processing device is known from U.S. Pat. No. 5,046,107. In the known device the controllable parameter referred to each time is the signal strength of the audio signal and the local value is an offset with respect to the global setting of the signal strength. In a given embodiment the known device comprise a separate control for adjusting the local values associated with the selected signal source. This control enables mutual differences in signal volume among the various signal sources to be compensated for. This has the drawback that an additional control element is required and that for each volume correction the user is expected to decide how the correction should be divided between the global volume and the offset value. If the user decides that both values should be corrected, two actions are required.

In another embodiment the known device does not have a separate control for the offset value associated with the selected signal source but the offset value is determined by the master volume control. However, it is not clear how and under what conditions a correction of the master volume control causes a change in the offset value.

SUMMARY OF THE INVENTION

It is an object of the invention to provide a signal processing device and a method of the types defined in the opening paragraphs, which automatically compensate for differences in signal parameters, such as for example volume of sound and picture contrast of a TV signal, between the various signal sources.

To this end, the device in accordance with the invention is characterized in that the device further comprises:
- detection means for determining whether a change $\delta W$ of W occurs, induced by a change of the setting of the control, within a predetermined time interval $\Delta T$ after selection of a signal source,
- means adapted to change L by an amount $\delta L$ and G by an amount $\delta G$ if $\delta W$ occurs within $\Delta T$.

As a result of these measures, parameter adaptations within a given time interval after changing over from one signal source to another are interpreted as an intention to adapt, in addition to the global parameter value, also the local value for the signal source just selected to a given extent. Depending on the degree of change in the local values differences with respect to other signal sources will be compensated for automatically after a given signal source has been selected at least 1 time. After said time interval the local value is no longer adapted and parameter adaptations are regarded as corrections of the global setting, for example in order to allow for changing ambient conditions, a changing mood of the user, or changing signal properties.

A further advantage of the invention is the absence of an additional control for setting local values, as a result of which the device can be cheaper and more compact.

The invention is very suited for use in radio and television receivers for the automatic compensation of differences in volume of sound among radio stations and television stations, respectively. The invention can also be used in amplifiers for automatic control of the input sensitivities. Moreover, the invention can be utilized for other parameters than volume, for example brightness, contrast or equalizer settings.

BRIEF DESCRIPTION OF THE DRAWING

These and other aspects of the invention will be described in more detail with reference to an embodiment given by way of example.

The FIGURE shows a diagram of a television receiver as an example of a signal processing device in accordance with the invention.

DESCRIPTION OF THE PREFERRED EMBODIMENTS

Figure 1:
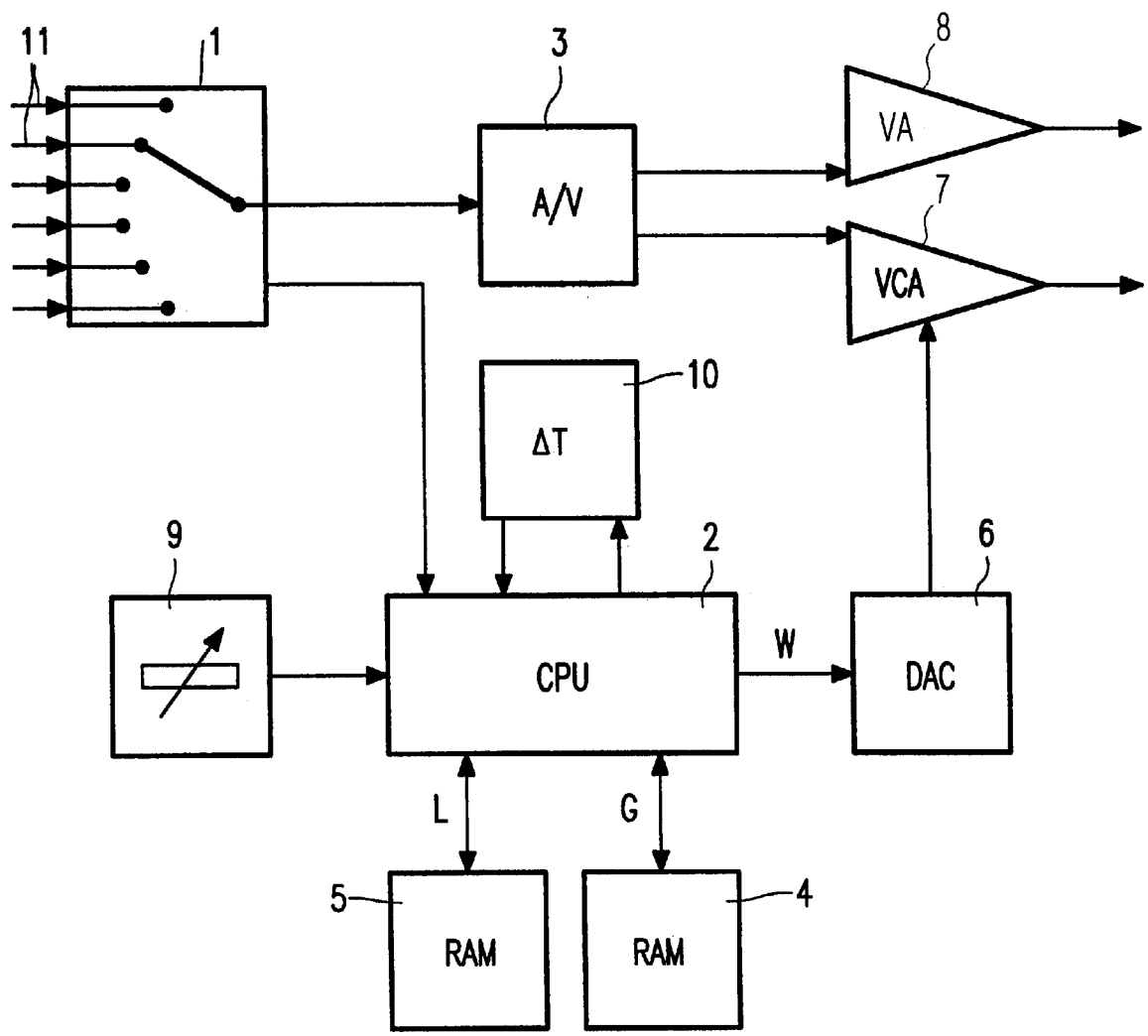

The television receiver shown in the FIGURE comprises as signal source selection means a channel selector 1, known per se, which has a plurality of preselection positions (presets). A TV channel 11 of a set of TV channels can be assigned to each preset, so that this channel is rapidly accessible via a touch control or numerical index corresponding to the relevant preset. The channel selector 1 can transfer a selected TV signal to an input of an audio/video splitter 3. The audio/video splitter 3 has a video output connected to a video input of a video amplifier 8 and has an audio output connected to an audio input of a voltage-controlled audio amplifier (VCA) 7. The device further comprises a CPU 2 arranged to receive information from the channel selector 1, a control 9, a first storage register 4, a plurality of second storage registers 5 and a timer 10. The CPU 2 can supply information to the first storage register 4, the second storage registers 5, the timer 10 and a digital-to-analog converter (DAC) 6. The number of second storage registers 5 is equal to the number of presets. The DAC 6 has its output connected to the control input of the VCA 7.

The channel selector 1 is controlled by the user to select a TV channel. After a selection the channel selector 1 informs the CPU 2 which preset has been selected. Moreover, the channel selector 1 transfers the TV signal to the audio/video splitter 3. The extracted audio signal is transferred to the VCA 7 and the extracted video signal is transferred to the video amplifier 8. One of the second storage registers 5 is associated with each preset to store a local value L of the sound volume. After selection of a preset the CPU 2 fetches a global value G of the volume from the first storage register 4 and the local value L of the relevant preset from the second storage register 5. The domains of L and G may differ from one another. For example, 4 bits may be reserved for L and 6 bits for G, resulting in domains of 16 and 64 values, respectively. The CPU 2 combines these two values, for example by addition, so as to form a resultant value W, which is transferred to the DAC 6. The DAC converts the digital value into an analog control signal which is employed to determine the gain factor of the VCA 7 so as to obtain a resultant value for the volume of sound.

After channel selection the CPU 2 also supplies a start signal to the timer 10, which assumes another state, identifiable by the CPU 2, for a given time interval $\Delta T$. The length of the time interval $\Delta T$ can have a predetermined constant value but can alternatively be dependent in a predetermined manner on conditions before or during $\Delta T$.

If the user corrects the setting of the control 9 before or after this time interval the CPU 2 only changes the global value G of the volume in the first storage register 4, combines the new value G with the local value L from the second storage register 5, and transfers the resultant value W to the DAC 6, after which the volume is changed as described.

If the user makes the correction within the time interval $\Delta T$, the CPU 2 changes the global value G of the volume in the first storage register 4 by a predetermined amount $\delta G$, it changes the local value L of the selected preset in the second storage register 5 by a predetermined amount $\delta L$, and it combines the new values of G and L to adapt the volume as described.

Thus, volume corrections immediately after selection of a channel affect the local value associated with the selected channel. These corrections are regarded as intentions to compensate for a difference in volume with the last selected channel. By dividing the correction between the global value and the local value it is achieved that the volume requires a smaller correction upon a subsequent selection of the relevant channel. The user need not be aware of this process. No separate action is required to set the local values and, consequently, not a special control element.

The change $\delta G$ in the global value can be zero. In that case a volume correction is wholly allocated to the local value. Thus, mutual differences in volume are canceled at once, while the global volume setting is not affected. The latter ensures that the user need not readjust the volume when a following channel is selected. This advantage can also be achieved by allowing $\delta G$ to be non-zero but canceling this change upon selection of a subsequent channel. The volume correction is now included only partly in the local value, so that this value is adapted more gradually.

With these embodiments the problem may arise that the user also or merely intended to adjust the global volume. Upon selection of a following channel it will then appear that this adjustment has not been made. This problem can be mitigated by making the length of the time interval $\Delta T$ not too large. Indeed, as the time goes by the likelihood increases that a volume correction is intended to adapt the global level because certain conditions such as the ambient noise, the state of mind of the user, or the nature of the audio signal change. To give the user ample opportunity to come to an optimum adjustment in spite of this, the length of $\Delta T$ could be made dependent on conditions before or during $\Delta T$. The initial length of $\Delta T$ could be dependent on, for example, the rate at which prior operating actions succeed one another or on the detected difference between the local values of the current channel and the preceding channel. Moreover, $\Delta T$ could be incremented by a given amount after each correction, while the increment could depend on the frequency and/or the amplitude of the applied corrections.

There are different ways of combining the global value G and the local value L to the resultant value W. In the present embodiment W is the sum of G and L, resultant values for W which exceed the domain of W being mapped on the exceeded domain limit. This check can be dispensed with if the domains of W, G and L are selected in such a manner that exceeding is not possible. If a correction $\delta W$ occurs within the time interval $\Delta T$, there are different ways of determining $\delta G$ and $\delta L$. Some possibilities are:

$\delta L = \delta W/N$, $\delta G = \delta W * (N-1) / N$. Here the correction is divided between $\delta G$ and $\delta L$ in a constant ratio, so that the local value is adapted only gradually.

$\delta L = (\delta W+1)/3$. Here, the ratio between $\delta L$ and $\delta G$ is no longer constant. For small corrections $\delta W$ the value $\delta L$ is comparatively large, whereas for large corrections $\delta L$ is comparatively small.

$\delta L$ is a function of $\delta W$ in the following manner:
if $\delta W >= 2$ then $\delta L = 1$
if $\delta W <= -2$ then $\delta L = -1$
if $\delta W > -2$ and $\delta W < 2$ then $\delta L = 0$ This algorithm allows only small steps $\delta L$, as a result of which the local values are reached only after the relevant channel has been selected a number of times. Conversely, the risk of overshooting or misinterpretation is comparatively small.

In another embodiment W is the product of G and L. An advantage of this is that for any value of G a local value L equal to zero yields a resultant value W equal to zero. As a result of this, the volume of sound of a channel can be reduced to zero in an absolute sense. Another advantage is that problems with domain limits can be precluded simply, for example, by making G and L equal to one another and making the domain of G range from 0 to 1.

The manner in which $\delta L$ is determined as a function of $\delta W$ can also depend on the instant t at which the correction $\delta W$ is applied, starting from the beginning of the time interval $\Delta T$. Examples of such functions are:

$$\delta L = \delta W - (\delta W/\Delta T)*t$$

and:

$$\delta L = \delta W * (\cos(180 * t/\Delta T) + 1)/2$$

Here, $\delta L$ is substantially equal to $\delta W$ if $\delta W$ starts immediately after selection of another channel. The effect on the local value decreases and the effect on the global value increases as it takes longer before the correction $\delta W$ is applied. This corresponds to the intuition that immediately after changing over a user is most aware of a difference in volume with the preceding channel and a volume correction is likely to be intended in order to achieve a permanent compensation for this difference. After this, it becomes more likely that other factors change, such as the ambient noise, the state of mind of the user, or the nature of the audio signal itself. As a result, it also becomes more likely that a volume correction is intended to adapt the global level.

In addition to the audio volume, it is likewise possible to adjust other parameters automatically for each signal source, such as brightness, contrast or equalizer setting. Each parameter requires the addition of:

1. a control
2. a storage register for the global value
3. storage registers for the local value for each signal source
4. a device for effecting the parameter adjustment.

For each of the embodiments described hereinbefore reference has been made to parameter corrections initiated by the user by means of a control which can be operated. However, the control may alteratively comprise an automatic circuit which can initiate the parameter corrections autonomously. Such a control could, for example, reduce the volume of sound when it exceeds a given maximum value, or it could measure the difference in volume between two channels and apply a volume correction on the basis of this difference.

Summarizingly, the invention relates to a signal processing device which comprises a signal source selection means (1), such as a channel selector in a television receiver or a source selection circuit in an amplifier, differences in signal parameters, such as for example volume of sound or picture brightness, between the signal sources (11) being compensated automatically. For this purpose the invention utilizes corrections which are applied to the relevant parameter within a given time interval after the source selection. These corrections are divided within said time interval between the global value and a local value (for example an offset) for the relevant signal source.

What is claimed is:

1. A signal processing device comprising:
   a signal source selection device, which selects a signal source from a set of at least two signal sources, a signal from each of the signal sources having at least one controllable parameter, whose value W is defined by a global value G and a local value L, associated with a selected signal source;
   a control for adjusting the value W;
   a storage register for the storage of the global value G;
   for each signal source, a storage register for the storage of the local value L; and
   a device which obtains the resultant value W by means of a predetermined combination of G and L, further comprising:
   (a) detector which determines whether a change $\delta W$ of W occurs, induced by a change of the setting of the control, within a predetermined time interval $\Delta T$ after selection of a signal source, and
   (b) an adaptor adapted to change L by an amount $\delta L$ and G by an amount $\delta G$ if $\delta W$ occurs within $\Delta T$.

2. A signal processing device as claimed in claim 1, wherein $\delta G$ is substantially 0.

3. A signal processing device as claimed in claim 1, wherein the device also comprises a canceller which cancels the change $\delta G$ upon selection of another signal source.

4. A signal processing device as claimed in claim 1, wherein W is substantially equal to the sum of L and G.

5. A signal processing device as claimed in claim 1, wherein W is substantially equal to the product of L and G.

6. A signal processing device as claimed in claim 1, wherein said changes $\delta L$ and $\delta G$ are functions of the instant at which the change $\delta W$ is induced, starting from the beginning of $\Delta T$.

7. A signal processing device as claimed in claim 1, wherein the device also comprises an adjustor which adjusts the length of the time interval $\Delta T$ in dependence upon predetermined conditions before or during $\Delta T$.

8. A television receiver including a channel selector signal processing device as claimed in claim 1, the signal source selector being a channel selector.

9. A method of processing signals, comprising the steps of:
   selecting a signal source from a set of at least two signal sources, a signal from each of the signal sources having at least one controllable parameter, whose value W is defined by a global value G and a local value L associated with a selected signal source;
   adjusting the value W;
   storing the global value G;
   storing for each signal source, the associated local value L;
   determining the resultant value W by means of a predetermined combination of G and L, if the adjustment of the value W is detected within a predetermined time interval $\Delta T$ after selection of a signal source, and also changing L by an amount $\delta L$ and changing G by an amount $\delta G$, if $\delta W$ occurs within $\Delta T$.

10. A method as claimed in claim 9, wherein $\delta G$ is substantially 0.

11. A method as claimed in claim 9, wherein the change $\delta G$ is canceled upon selection of another signal source.

12. A method as claimed in claim 9, wherein W is substantially equal to the sum of L and G.

13. A method as claimed in claim 9, wherein W is substantially equal to the product of L and G.

14. A method as claimed in claim 9, characterized wherein said changes $\delta L$ and $\delta G$ are functions of the instant at which the change $\delta W$ is induced, starting from the beginning of $\Delta T$.

15. A method as claimed in claim 9, wherein the method also comprises adjusting the length of the time interval $\Delta T$ in dependence upon predetermined conditions before or during $\Delta T$.

16. A method as claimed in claim 9, wherein the method comprises selecting channels in a television receiver.

* * * * *